US011491750B2

(12) United States Patent
Conner et al.

(10) Patent No.: US 11,491,750 B2
(45) Date of Patent: Nov. 8, 2022

(54) MOLDLESS VACUUM INFUSION PROCESS

(71) Applicant: VARIAL SURF TECHNOLOGY, INC., Ventura, CA (US)

(72) Inventors: Edison Conner, Santa Barbara, CA (US); Parker Borneman, Santa Barbara, CA (US)

(73) Assignee: VARIAL SURF TECHNOLOGY, INC., Ventura, CA (US)

( * ) Notice: Subject to any disclaimer, the term of this patent is extended or adjusted under 35 U.S.C. 154(b) by 825 days.

(21) Appl. No.: 16/241,511

(22) Filed: Jan. 7, 2019

(65) Prior Publication Data
US 2020/0215774 A1 Jul. 9, 2020

(51) Int. Cl.
*B29C 70/86* (2006.01)
*B29C 70/54* (2006.01)
(Continued)

(52) U.S. Cl.
CPC .......... *B29C 70/865* (2013.01); *B29C 70/086* (2013.01); *B29C 70/22* (2013.01);
(Continued)

(58) Field of Classification Search
CPC .... B29C 70/865; B29C 70/443; B29C 70/687
See application file for complete search history.

(56) References Cited

U.S. PATENT DOCUMENTS 4,255,221 A * 3/1981 Young ..................... B32B 3/266
156/382
5,830,025 A 11/1998 Fleming
(Continued)

FOREIGN PATENT DOCUMENTS

GB 2542662 A * 3/2017 ............. B29C 70/48

OTHER PUBLICATIONS

Guide to Resin Infusion, Easy Composites, www.easycomposites.co.uk, pp. 1-12, 2016.
(Continued)

*Primary Examiner* — Niki Bakhtiari
*Assistant Examiner* — Nicholas J Chidiac
(74) *Attorney, Agent, or Firm* — KOS IP Law LLP

(57) ABSTRACT

A manufacturing method contemplates performing vacuum-assisted resin infusion to enclose an elongated core within a cured composite laminate without employing a mold. Not relying upon an external mold enables the process to be efficiently performed for core shapes that are manufactured in low volumes. Typical resin infusion processes utilize flow media that induces bag bridging during vacuum draw in order to provide gaps facilitating resin flow. However, popular flow media also tends to impart directional aggregate forces during vacuum draw, which forces can deform the core since no mold is being used. To avoid unequal and non-dispersed directional forces from deforming the elongated core, a flow media is employed that is configured to disperse and/or reduce such forces. Some such flow media may be knitted so as to allow overlapping strands to slide over one another. Other flow media may ensure that strands are interleaved so that no one strand or group of strands is disposed outwardly of other strands along a substantial length of the strands, thus dispersing bag bridging forces in several directions and avoiding directional aggregate forces. However, such flow media may have inhibited resin flow relative to popular high-flow flow media, and thus new strategies have been developed to ensure appropriate wetting of fibrous reinforcement. An adjustable brace can also be employed to restrain the elongated core from deflecting during application of vacuum and/or resin infusion.

20 Claims, 11 Drawing Sheets

(51) Int. Cl.
*B29C 70/44* (2006.01)
*B29C 70/68* (2006.01)
*B29C 70/30* (2006.01)
*B29C 70/22* (2006.01)
*B63B 32/57* (2020.01)
*B29C 70/74* (2006.01)
*B29C 70/08* (2006.01)
*B29L 31/52* (2006.01)
*B29L 9/00* (2006.01)

(52) U.S. Cl.
CPC .......... *B29C 70/224* (2013.01); *B29C 70/228* (2013.01); *B29C 70/30* (2013.01); *B29C 70/443* (2013.01); *B29C 70/543* (2013.01); *B29C 70/546* (2013.01); *B29C 70/682* (2013.01); *B29C 70/745* (2013.01); *B63B 32/57* (2020.02); *B29L 2009/00* (2013.01); *B29L 2031/5272* (2013.01)

(56) References Cited

U.S. PATENT DOCUMENTS

| | | | | |
|---|---|---|---|---|
| 7,905,067 | B2* | 3/2011 | Schiffmann | B29C 70/865 52/293.3 |
| 7,926,233 | B2* | 4/2011 | Schiffmann | B29C 70/443 52/293.1 |
| 7,926,241 | B2* | 4/2011 | Schiffmann | B32B 5/28 52/793.1 |
| 7,930,861 | B2* | 4/2011 | Schiffmann | B32B 3/22 52/293.1 |
| 8,012,301 | B2* | 9/2011 | Schiffmann | B29C 70/865 156/307.1 |
| 8,082,711 | B2* | 12/2011 | Schiffmann | B29C 70/443 52/293.1 |
| 8,266,867 | B2* | 9/2012 | Schiffmann | B29C 70/30 52/793.1 |
| 8,322,097 | B2* | 12/2012 | Schiffmann | B29C 70/86 52/293.1 |
| 8,322,098 | B2* | 12/2012 | Schiffmann | B29C 70/443 52/293.1 |
| 8,393,123 | B2* | 3/2013 | Schiffmann | B32B 5/28 52/293.1 |
| 9,045,201 | B1 | 6/2015 | Kuzmarskis et al. | |
| 9,370,902 | B2* | 6/2016 | Barnell | B29C 70/443 |
| 9,809,286 | B1 | 11/2017 | Jorgensen et al. | |
| 9,908,993 | B1* | 3/2018 | Barnell | B29C 70/443 |
| 10,167,379 | B1* | 1/2019 | Barnell | B29C 70/36 |
| 2004/0086686 | A1 | 5/2004 | Holemans | |
| 2005/0277494 | A1 | 12/2005 | Goss | |
| 2008/0127584 | A1* | 6/2008 | Schiffmann | E02D 27/02 52/293.3 |
| 2008/0127600 | A1* | 6/2008 | Schiffmann | E04C 2/243 52/741.1 |
| 2008/0127601 | A1* | 6/2008 | Schiffmann | B29C 70/86 52/741.1 |
| 2008/0127602 | A1* | 6/2008 | Schiffmann | B29C 70/86 52/741.11 |
| 2008/0127604 | A1* | 6/2008 | Schiffmann | B29C 70/443 52/745.2 |
| 2008/0127607 | A1* | 6/2008 | Schiffmann | E04C 2/246 52/793.11 |
| 2008/0148659 | A1* | 6/2008 | Schiffmann | B29C 70/443 52/272 |
| 2010/0122763 | A1 | 5/2010 | Schubiger | |
| 2010/0140404 | A1 | 6/2010 | Maxwell et al. | |
| 2011/0167739 | A1* | 7/2011 | Schiffmann | E04C 2/246 52/169.1 |
| 2011/0203205 | A1* | 8/2011 | Schiffmann | B32B 5/28 52/293.1 |
| 2011/0239569 | A1* | 10/2011 | Schiffmann | B29C 70/865 52/309.4 |
| 2011/0293914 | A1 | 12/2011 | Maurer et al. | |
| 2012/0052247 | A1* | 3/2012 | Pook | B29C 66/474 428/161 |
| 2014/0072753 | A1 | 3/2014 | Prissok et al. | |
| 2014/0141114 | A1 | 5/2014 | Kulesha | |
| 2014/0295725 | A1 | 10/2014 | Passmann et al. | |
| 2015/0099834 | A1* | 4/2015 | Barnell | B29C 70/443 523/468 |
| 2015/0224721 | A1 | 8/2015 | Bendel et al. | |
| 2015/0343714 | A1 | 12/2015 | Weimer et al. | |
| 2016/0200070 | A1 | 7/2016 | Lee et al. | |
| 2016/0243750 | A9 | 8/2016 | Rodman | |
| 2017/0305107 | A1 | 10/2017 | Kim et al. | |
| 2017/0334150 | A1 | 11/2017 | Roberts | |
| 2018/0009960 | A1 | 1/2018 | Ruckdäschel et al. | |
| 2018/0072005 | A1 | 3/2018 | Gu et al. | |

OTHER PUBLICATIONS

Guide to Resin Infusion, Carbon Mods, www.carbonmods.co.uk, pp. 1-12, 2010.
Keahana Glassing Process With Vacuum Infusion, keahanausa.blogspot.com/2012/08/keahana-glassing-process-with-vacuum.html, Apr. 14, 2012.
Moldless Composite Construction, https://www.fibreglast.com/product/moldless-composite-construction/Learining_Center, pp. 1-13, Sep. 19, 2018.
Chenhui Zhao et al., Resin Flow Behavior Simulation of Grooved Foam Sandwich Composites with the Vacuum Assisted Resin Infusion (VARI) Molding Process, Materials, Jul. 23, 2012, pp. 1285-1296, ISSN 1996-1944, www.mdpi.com/journal/materials.
An introduction to resin infusion, Reinforced Plastics, Jan./Feb. 2014, www.reinforcedplastics.com, pp. 25-29, Elsevier Ltd.

* cited by examiner

MOLDLESS VACUUM INFUSION PROCESS

BACKGROUND

The present disclosure relates to the field of vacuum infusion of composite parts.

Vacuum-assisted resin infusion, also referred to as vacuum infusion or resin infusion, is a process for making composite laminate parts having a high fiber-to-resin ratio by using a vacuum to draw resin through a fibrous reinforcement. Currently, the vacuum infusion process often is used to make composite parts that take on the shape of an underlying rigid mold. Dry fibrous reinforcement materials, such as one or more sheets or pieces of woven and/or non-woven fiberglass, carbon fiber, and/or aramid fiber fabric are placed upon the mold surface. A release liner, such as a peel ply or perforated release film, is typically placed atop the fabric, and a resin distribution medium, referred to as a flow media, is placed atop the release layer. This stack of materials atop the mold is enclosed within a vacuum bag, and a resin delivery port and vacuum port are installed.

Once the vacuum bag setup has been completed, a vacuum is drawn, evacuating air and compressing the stack of materials, including the fibrous reinforcement. Resin is then introduced through the resin delivery port and infuses through the fibrous reinforcement as it is drawn from the delivery port toward and to the vacuum port. The flow media facilitates resin flow during the infusion process by creating gaps and paths that facilitate resin flow. When flow media is used correctly, resin is substantially evenly distributed throughout the fibrous reinforcement and flow is controlled. Such flow media typically comprises a plastic mesh-like construction. The peel ply release layer is typically a thin woven fabric through which resin can flow, and which is removable after the resin has cured so that neither the flow media nor the release layer is incorporated into the cured part.

Due to movement and deflection of the vacuum bagging materials during application of the vacuum and resin movement through the stack of materials, substantial forces can be generated which exert bending and twisting forces on the part. This is not usually a problem, as the mold typically is sufficiently rigid to offset the forces without changing shape.

Some composite parts, such as surfboards, employ a sandwich construction in which a flexible core, such as a shaped foam core, is enclosed within a composite-laminate skin. Surfboards often are available in a wide variety of shapes and lengths, and often are custom made, such that the sales volume of any particular shape and length may not justify fabrication of a dedicated rigid mold. Such parts thus are formed without using a mold, and the core alone supports the composite skin during the process of wetting the fibrous reinforcement with resin. As such, these parts typically are constructed using methods such as traditional wet layup processes, which result in a composite skin having relatively high resin content and weight, and relatively low strength. Efforts to use a variation of the vacuum infusion process for such parts are fraught with challenges. For example, since the foam core typically is much more flexible than a rigid mold, forces incident to application of vacuum and/or resin flow during infusion can distort the core and, thus, the resulting composite laminate, resulting in an unacceptably distorted part.

SUMMARY

There is a need in the art for a method and apparatus for moldlessly vacuum infusing parts in which fiber reinforcement encases a core in a manner so that forces incident to vacuum bagging and resin flow are controlled and distortion of the cured composite part is minimized.

In accordance with one embodiment, the present specification provides a method of making a water sports board. The method includes assembling a dry layup about an elongated foam core. Assembling the dry layup includes wrapping a fibrous reinforcement about the elongated foam core when the elongated foam core is in an at rest configuration having a desired, non-deformed shape, enclosing the elongated foam core and fiber reinforcement within a release layer, enclosing the elongated foam core, fiber reinforcement and release layer within a flow media, the flow media comprising a plurality of overlapping polymer strands that are slidable over one another, enclosing the elongated foam core, fiber reinforcement, release layer and flow media within a vacuum bag, and establishing a resin inlet and a vacuum port, the resin inlet being proximal of a proximal end of the elongated foam core, the vacuum port being distal of a distal end of the elongated foam core. The method further includes resting the assembled dry layup on a plurality of supports so that the assembled dry layup is unsupported between the one or more supports and the elongated foam core remains in the at rest configuration while resting on the plurality of supports, and establishing a vacuum via the vacuum port. The vacuum compresses the assembled dry layup so that the vacuum bag is drawn into contact with the flow media and at least some of the strands of the flow media slide over others of the strands to disperse forces generated between the vacuum bag and flow media. The resin inlet is connected to a source of resin so that resin is infused through the fibrous reinforcement from the proximal end to the distal end.

In some embodiments, the plurality of overlapping polymer strands are knitted together.

In additional embodiments, the plurality of overlapping polymer strands are knitted via a repeating knitting pattern in which a first strand overlaps a second strand with a double loop.

In yet additional embodiments, the elongated foam core has a modulus less than 2,000 psi.

In further embodiments, the elongated foam core comprises opposing edges that extend from the proximal end to the distal end, and a widest point between the opposing edges is disposed between the proximal end and the distal end, and additionally comprising arranging a resin dispersing tube adjacent the proximal end and extending distally along and adjacent the opposing edges to a termination point spaced from the distal end, and placing the resin dispersing tube into communication with the resin inlet, the resin inlet being proximal of the resin dispersing tube.

In some such embodiments, the termination point is spaced a distance less than 10% of the length of the elongated foam core from the widest point. In other such embodiments, the distance is less than 5% of the length of the elongated foam core from the widest point. In yet further embodiments, the termination point is closer to the proximal end than the distal end. In still other embodiments, the termination point is distal of the widest point, and the resin dispersing tube diverges from the opposing edges moving distally from of the widest point.

In still further embodiments, the one or more supports are part of an adjustable brace, and some embodiments additionally comprise, prior to establishing a vacuum, adjusting a plurality of spaced-apart clamps of the brace to engage the assembled dry layup so as to inhibit bending of the elongated core. Some such embodiments additionally comprise removing the vacuum after resin is infused and cured, and maintaining the plurality of clamps in engagement with the assembled dry layup until after the vacuum is removed.

In accordance with another embodiment, the present specification provides a method of enclosing an elongated core within a composite skin without employing an external mold. A layup stack is assembled about elongated core by wrapping a fibrous reinforcement about the elongated core so as to enclose the elongated core and enclosing the elongated core and fiber reinforcement within a release layer. The elongated core, fiber reinforcement and release layer are enclosed within a flow media, which flow media comprises a plurality of polymer strands that are interleaved so that a first one of the strands is disposed outwardly relative to a second one of the strands over a first portion of the flow media and the second one of the strands is disposed outwardly relative to the first one of the strands over a second portion of the flow media, the flow media comprising a plurality of first portions and a plurality of second portions. The elongated core, fiber reinforcement, release layer and flow media are enclosed within a vacuum bag. The method additionally comprises establishing a resin inlet and a vacuum port, the resin inlet being proximal of a proximal end of the elongated core, the vacuum port being distal of a distal end of the elongated core. The assembled layup stack is rested atop a plurality of spaced apart bottom supports so that the assembled layup stack is unsupported between adjacent ones of the bottom supports, and a vacuum is established via the vacuum port so that the assembled layup stack is compressed and the vacuum bag is drawn at least partially into the flow media. The resin inlet is connected to a source of resin so that resin is infused throughout the fibrous reinforcement from the proximal end to the distal end.

In additional embodiments, the plurality of polymer strands of the flow media are knitted to one another so that overlapping strands slide over one another when the vacuum bag is drawn at least partially into the flow media during establishment of the vacuum.

In some such embodiments, the elongated core comprises a foam water sports board core having a nose at the distal end, a tail edge at the proximal end, the tail edge having opposing tail corners, and arcuate rails extending from the tail corners to the nose. In further embodiments, the resin inlet comprises a dispersing tube, the dispersing tube being configured to distribute resin along its length between opposing ends, and wherein the dispersing tube extends along and adjacent the tail end and around the tail corners so that the opposing ends are spaced from the tail corners so that resin is introduced to the arcuate rails at a location spaced distally from the tail end. In some such embodiments, the opposing ends are within about 10% of the length of the foam water sports board core from at or proximal of a widest point between the rails of the foam water sports board core.

In still further embodiments, opposing portions of the dispersing tube diverge from one another from the tail corners to the opposing ends. In some such embodiments the opposing portions of the dispersing tube may follow the curvature of the arcuate rails generally from the tail to the widest point, and then diverge both from one another and from the arcuate rails moving distally beyond the widest point.

In additional embodiments, a single top layer of flow media is disposed atop the foam water sports board core and a single bottom layer of flow media is disposed below the foam water sports board core.

In yet further embodiments, the first portion of the flow media is adjacent the second portion of the flow media, and the flow media is configured in a pattern of repeating first portions interposed between second portions.

In still additional embodiments, the plurality of polymer strands of the flow media are woven together so that each strand overlaps a plurality of the strands at a plurality of spaced apart overlapping points, and the strands are attached to one another at each of the overlapping points.

Yet another embodiment additionally comprises placing the assembled layup stack in a brace comprising the plurality of spaced apart bottom supports, engaging a plurality of spaced apart contacts with the assembled layup stack so that the plurality of spaced apart contacts engage the assembled layup stack adjacent the arcuate rails, wherein the plurality of contacts are positioned and configured to block the foam water sports board core from deforming when the vacuum is established.

DESCRIPTION

Figure 1:
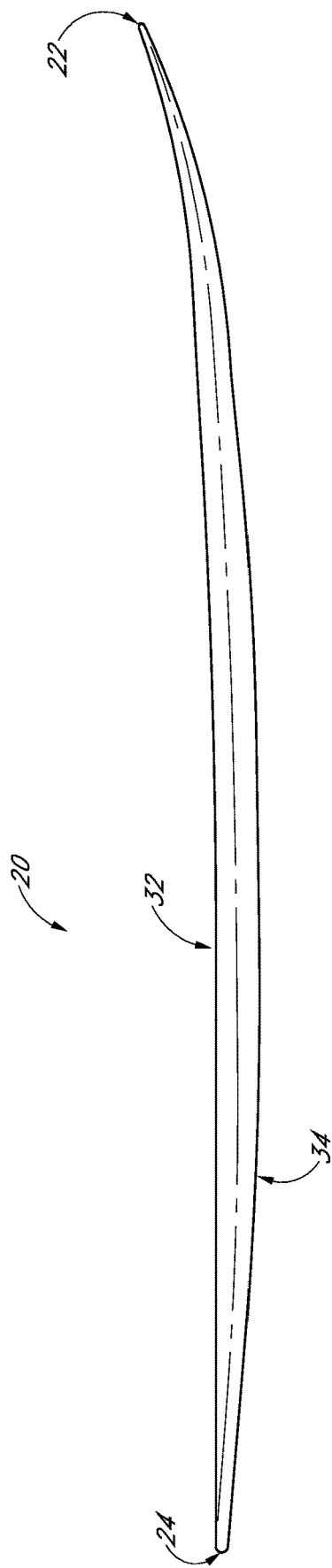
FIG. 1 is a side view of a foam core of an embodiment of a surfboard.

The present description describes embodiments in which a fiberglass skin is applied to a foam surfboard core using a moldless vacuum-assisted resin infusion process, which can also be referred to as vacuum infusion or resin infusion. It is to be appreciated that the principles discussed in these embodiments can be applied with other materials and applications, and the surfboard example is employed as one example of a part that can be constructed using inventive principles discussed herein. For example, various types and configurations of fibrous reinforcements, such as woven and non-woven fiberglass, carbon fibers, Kevlar™ (aramid) fibers, and the like, as well as a wide range of cores including foams (such as polyurethane (PU), expanded polystyrene (EPS), PVC, PET, etc.) and other core materials such as balsa, metallic and other honeycombs, and inflated materials can be used in inventive moldless resin infusion processes. Various types of resins, including polyester, epoxy, and vinyl ester resins, can also be used. It is also to be understood that surfboards represent one style of water sports boards, which share many aspects in common with surfboards. Water sports boards include, for example, surfboards, wake surfboards, kiteboards, skim boards, standup paddleboards, snow surfer boards, and the like. Although—for ease of discussion—the embodiments herein are discussed in the context of surfboards, inventive aspects discussed herein can also be employed to improve manufacturing of other water sports boards.

The vacuum-assistant resin infusion process typically includes a mold supporting the stack of materials. As such, the shape of the resultant part is dictated by the shape of the mold. Such molds are also typically employed even when the part to be formed includes a core such as a foam core, as such cores typically are not particularly rigid, and are susceptible to unacceptable deformation during the process. Making molds can be expensive, and molds are not easily reconfigured or adjusted, even for minor changes in product shape. Thus, in a manufacturing context, the mold-based resin infusion process is only cost-effective when a high-volume of parts are to be made having the specific shape of the mold.

Water sports boards, such as surfboards, typically employ a foam core encased within a composite skin. Although all surfboards share some basic features, the dimensions and shapes of such features are infinitely variable. For example, not only are basic features such as the length, width and thickness of surfboards infinitely variable, but also features such as the curvature, or "rocker", of the bottom, or hull, along the surfboard's length. Other infinitely variable features include the curvature along the top, or deck, of the surfboard, the shape and curvature of the edges, or rails, the profile of thickness along both the length and width, the shapes of the nose and tail, and placement of fins and fin boxes, as well as sometimes-subtle features formed into flow surfaces of the hull. Thus, even similarly-shaped surfboards can be anticipated to have many important differences. Also, surfboards tend to be a highly personal purchase. Just as every person is different, each person tends to desire, and need, differing setups for his or her surfboard, and surfboards are often custom-built. Further, different surf conditions and surfing styles indicate different surfboard configurations. As such, while a particular facility may produce a high volume of surfboards, comparatively few of such surfboards will have the exact same configuration. Thus, it is impractical to create a mold for each surfboard configuration, yet highly desired to have a reliable and cost-effective method to encase surfboard cores within composite skins using resin infusion.

In preferred embodiments, surfboards are typically between about 5-12 feet in length and 15-30 inches wide at their widest point. High performance surfboards are more likely between about 5½ and 7½ feet in length.

Depending on the configuration, resin infusion can be performed with one or more resin inlet ports and one or more vacuum ports. However, each port adds to the complexity, and thus expense, of the infusion process. Also, if ports are placed directly on the part there is an increased risk that the mounting hardware will affect the surface of the composite, thus increasing post-processing, and correspondingly increasing cost.

Figure 2:
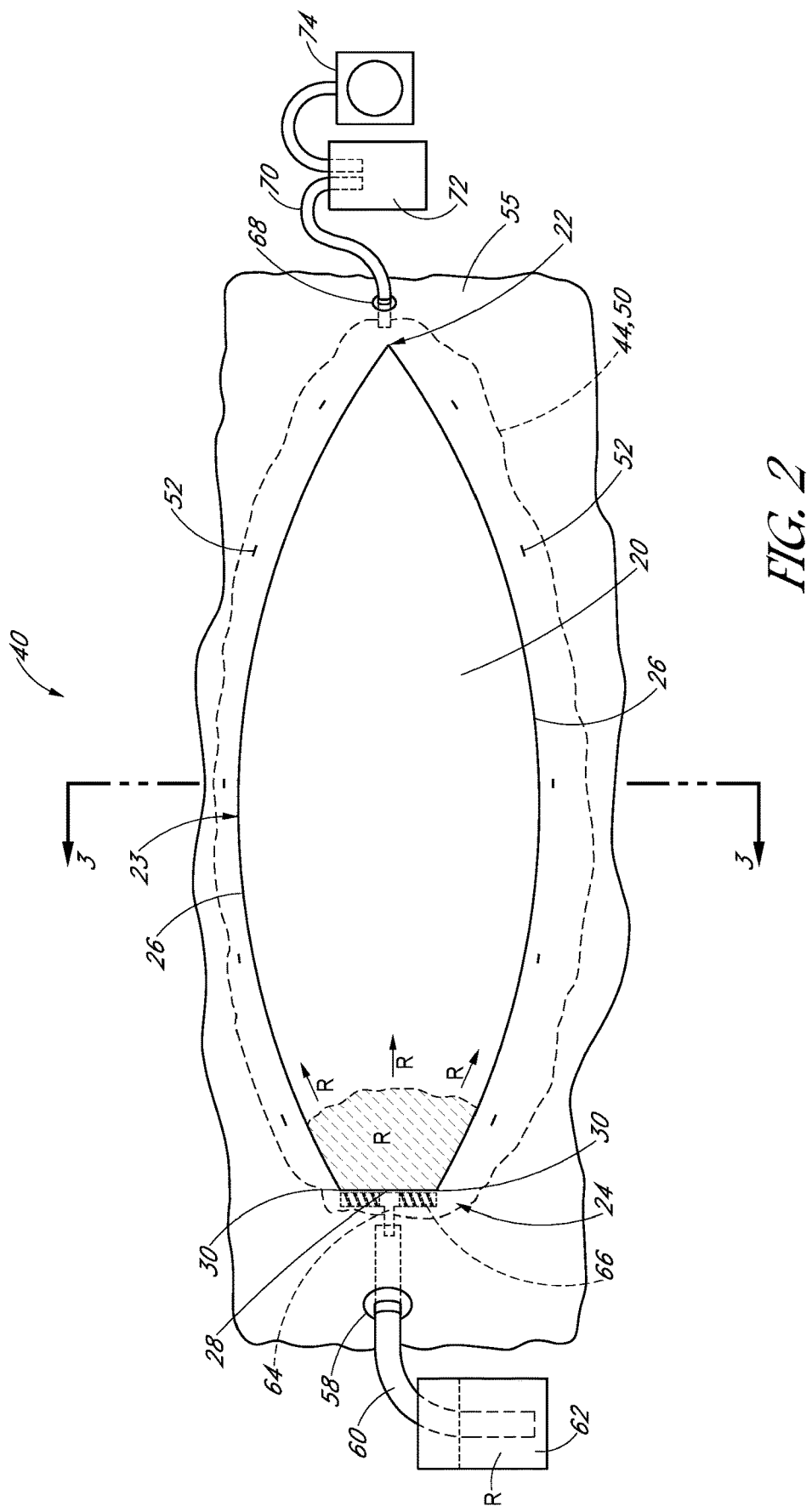
FIG. 2 is a schematic top view of an embodiment depicting an assembled vacuum-assisted resin infusion setup for encasing the surfboard core of FIG. 1 in a composite skin.

With initial reference to FIGS. 1 and 2 an embodiment of a surfboard core 20 comprises an elongated body extending from a nose 22 to a tail 24. Rails 26 extend along opposing edges from the nose 22 to the tail 24. The tail 24 preferably has a tail edge 28 between opposing tail corners 30, at which the tail edge 28 transitions to adjacent rails 26. The body includes a top surface 32, or deck, and a bottom surface 34, or hull. A thickness and a width of the core 20 changes along its length, with the surfboard typically being widest and thickest generally midway between the nose 22 and the tail 24. More specifically, a surfboards typically increase in the width between the rails 26 moving from the nose 22 towards the tail 24 until its widest point 23, at which a tangent of the rails is parallel to a longitudinal axis of the surfboard. From the widest point 23 the width between the rails decreases until the rails reach the tail 24. In some surfboards, the widest point 23 is readily visible. In other embodiments, the curvature of the rails 26 is gentle at and near the widest point 23 so that 20-40% of the length of the surfboard has a width within about 10% of the width at the widest point 23. Also, in many (but not all) surfboards, the nose is pointed or very narrow in width, while the tail 24 has a substantial width, defined by the length of the tail edge 28.

A curvature, or "rocker", is defined along the bottom surface 34 of the surfboard. The surfboard core 20 generally dictates the shape of the surfboard. Surfboard cores can be formed from a wide variety of materials, but are most commonly formed of an expanded polyurethane (PU) foam, and are sometimes formed of an expanded polystyrene (EPS) foam. Traditionally, foam surfboards have included a wooden reinforcement member, called a stringer, extending along the longitudinal axis of the surfboard core. The stringer (or stringers) increases the rigidity and resistance to deflection of the surfboard core. Some modern surfboard cores 20, such as the illustrated embodiment, do not include such a stringer, and thus the foam core has no rigid support member.

Figure 3:
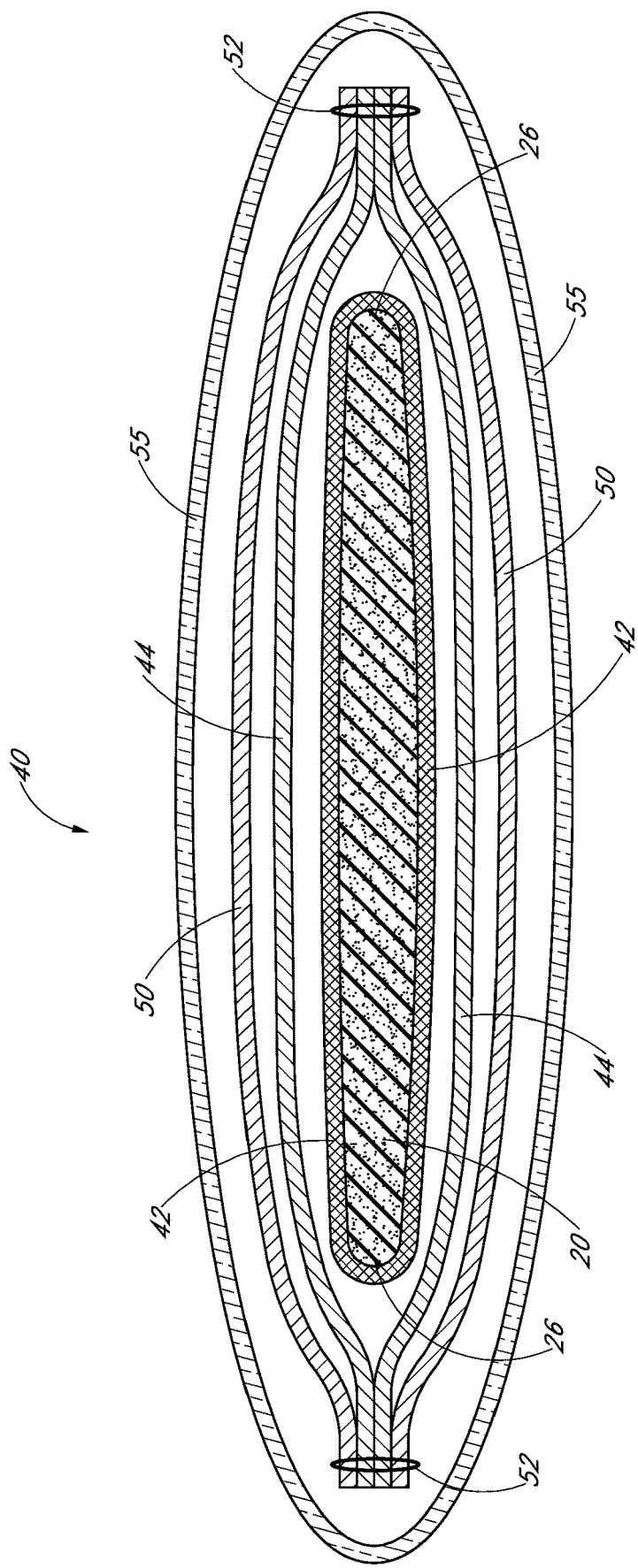
FIG. 3 is a view taken along line 3-3 of FIG. 2, schematically showing a stack of materials of the resin infusion setup of FIG. 2.

With particular reference next to FIGS. 2 and 3, an embodiment of a configuration of a vacuum-assisted resin infusion setup 40 is depicted schematically. In the illustrated embodiment, one or more layers of woven glass fiber reinforcement fabric 42 are applied directly to the core. Preferably, different fabric sheets are applied to the deck 32 and hull 34, and such sheets overlap one another along the rail 26. The reinforcement completely encases the core 20. Preferably, the fiber reinforcement is applied as a "dry" layup, in which no resin is applied. However, it is anticipated that an adhesive may be employed to hold the reinforcement 42 in a desired configuration about the core 20.

Once the fiber reinforcement 42 is in place, layers of a conventional release layer 44, such as a peel-ply, perforated release film, or the like, are disposed both above and below the core 20 adjacent the fiber reinforcement 42, followed by layers of a flow media 50 above and below the release layers 44. Preferably, each of the top and bottom peel-ply 44 and flow media 50 layers is made up of a single piece, so that, for example, a single piece of a flow media 50 material extends the full length and width of the core 20, with a separate piece for each of the top and the bottom. In a preferred embodiment, the top and bottom release layers 44 and flow media 50 layers are collectively secured to one another external of the core 20 with fasteners 52 such as staples. In this configuration, the release layers 44 and flow media 50 layers are generally retained in position relative to one another and the core 20, but loosely enough so that the layers can move slightly relative to one another when a vacuum is applied. A vacuum bag 55 is installed over the flow media 50. In the illustrated embodiment, the vacuum bag 55 comprises an elongated, tubular vacuum bag comprising a top and a bottom vacuum bag film 55. The vacuum bag is preferably applied so as to fully and sealingly enclose the core 20, fibrous reinforcement 42, and consumable media 44, 50.

A resin port 58 is established to deliver resin R to the material stack within the vacuum bag 55. In the illustrated embodiment, the resin port 58 is spaced proximally from the core 20. A resin tube 60 extends from a resin R held within a resin container 62 to and, possibly, through the resin port 58, to communicate resin to a T-coupler 64 that connects to, and delivers resin to, a spiral tubing 66 disposed adjacent (but preferably spaced from) the tail edge 28. The spiral tubing 66 is open so as to distribute resin R along its length, and can also be referred to as a resin dispersion tube, as spaces in the tube disperse resin along the tube's length. In the illustrated embodiment, the spiral tube 66 extends between the tail corners 30, and thus resin R is supplied from the resin container 64 and distributed adjacent the tail edge 28 of the core 20. Although the spiral tubing 66 is shown very close to the tail edge 28, preferably it does not touch the core or fibrous reinforcement, or apply any substantial force to the material stack. Rather, bottom and top layers of consumable media 44, 50 preferably engage one another between the reinforcement layers and the spiral tube 66. As such, the spiral tubing 66 will not leave an imprint in the composite when it is cured.

A vacuum port 68 creates a vacuum within the vacuum bag 55, and determines the direction of resin flow, as resin R will flow generally from the resin port 58 toward the vacuum port 68. In the illustrated embodiment the vacuum port 68 comprises a vacuum tube 70h opening adjacent, but spaced from, the nose 22 of the core 20 and extending through the bag 55 at the port 68 and to a resin trap 72, which in turn communicates with a source of vacuum 74. Preferably, the vacuum bag 55 is sealed about the vacuum tube 70.

Once the vacuum bag 55 has been sealed, the source of vacuum 74 can be activated, while the resin tube 60 is clamped. Thus, air is evacuated from within the vacuum bag 55, and the stack of materials is compressed. The flow media 50 preferably is configured so that spaces and paths are provided for resin R to flow through in order to help facilitate resin flow. After checking for and resolving any vacuum leaks, the resin R can be mixed and, if desired, degassed. The resin tube 60 is then unclamped, and resin R is drawn through the resin port 58, distributed adjacent the tail edge 28 of the core 20, and progresses simultaneously along both the deck 32 and hull 34 surfaces toward and to the nose 22 and further to the vacuum port 68 and into the resin brake 72.

Figure 4:
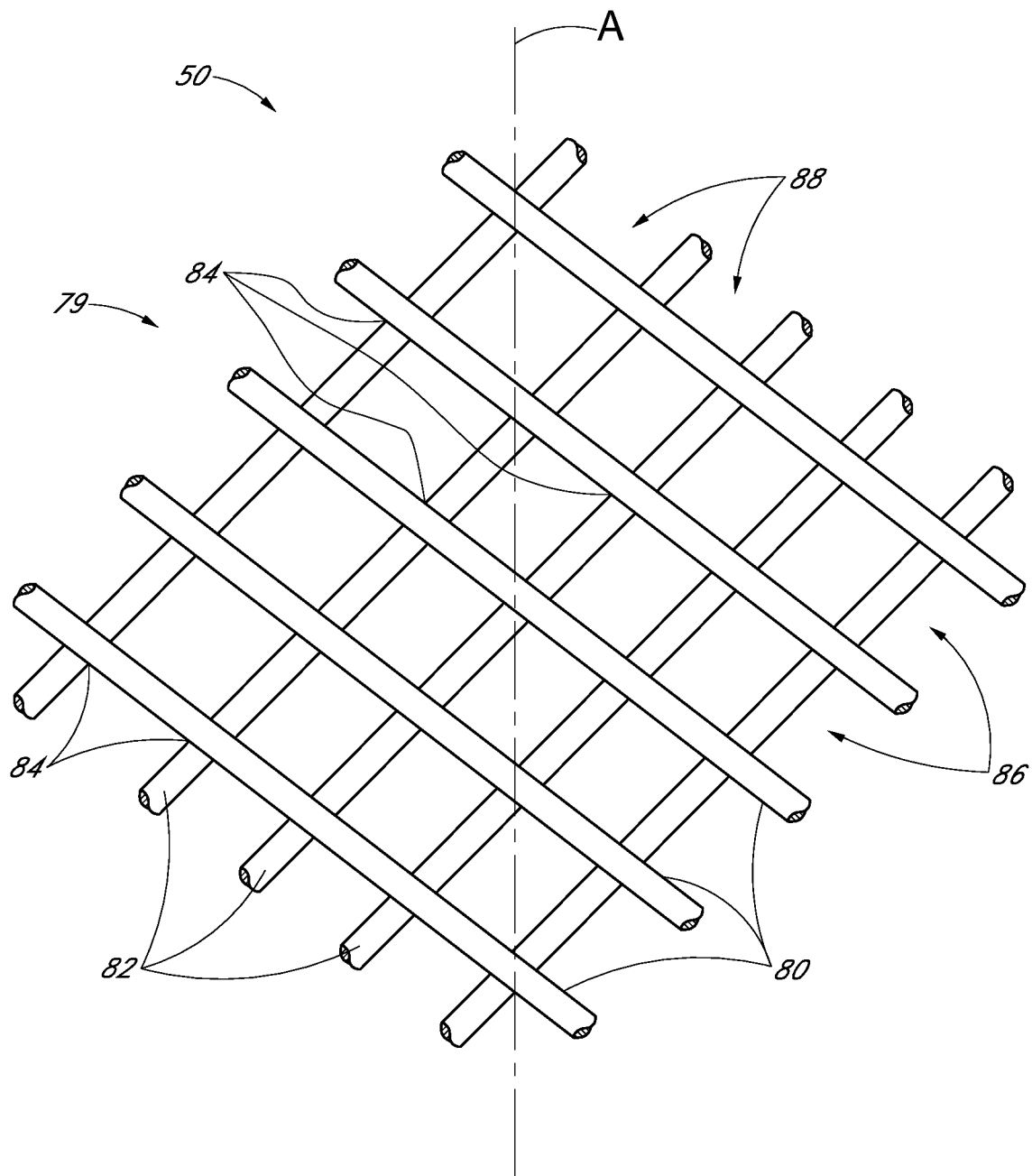
FIG. 4 is a schematic partial perspective view of one embodiment of a flow media.

With reference next to FIG. 4, one type of flow media 50 that is commonly used for vacuum-assisted resin infusion is a bi-planar extruded rhomboidal (diamond) mesh 79. This type of flow media is available in elongated sheets in which a series of spaced apart top strands 80 are disposed at a +45° angle relative to a longitudinal axis A of the sheet and a series of spaced apart bottom strands 82 are disposed at a −45° angle relative to the longitudinal axis A of the sheet. The top and bottom strands 80, 82 are bonded to one another at bonded intersections 84. As such, the top and bottom strands 80, 82 do not slide relative to one another. Due to the bi-planar configuration, top channels 86 are defined between adjacent top strands 80, and bottom channels 88 are defined between adjacent bottom strands 82. The channels are contiguous along their lengths, as the top strands 80 are always above the bottom strands 82.

Figure 5:
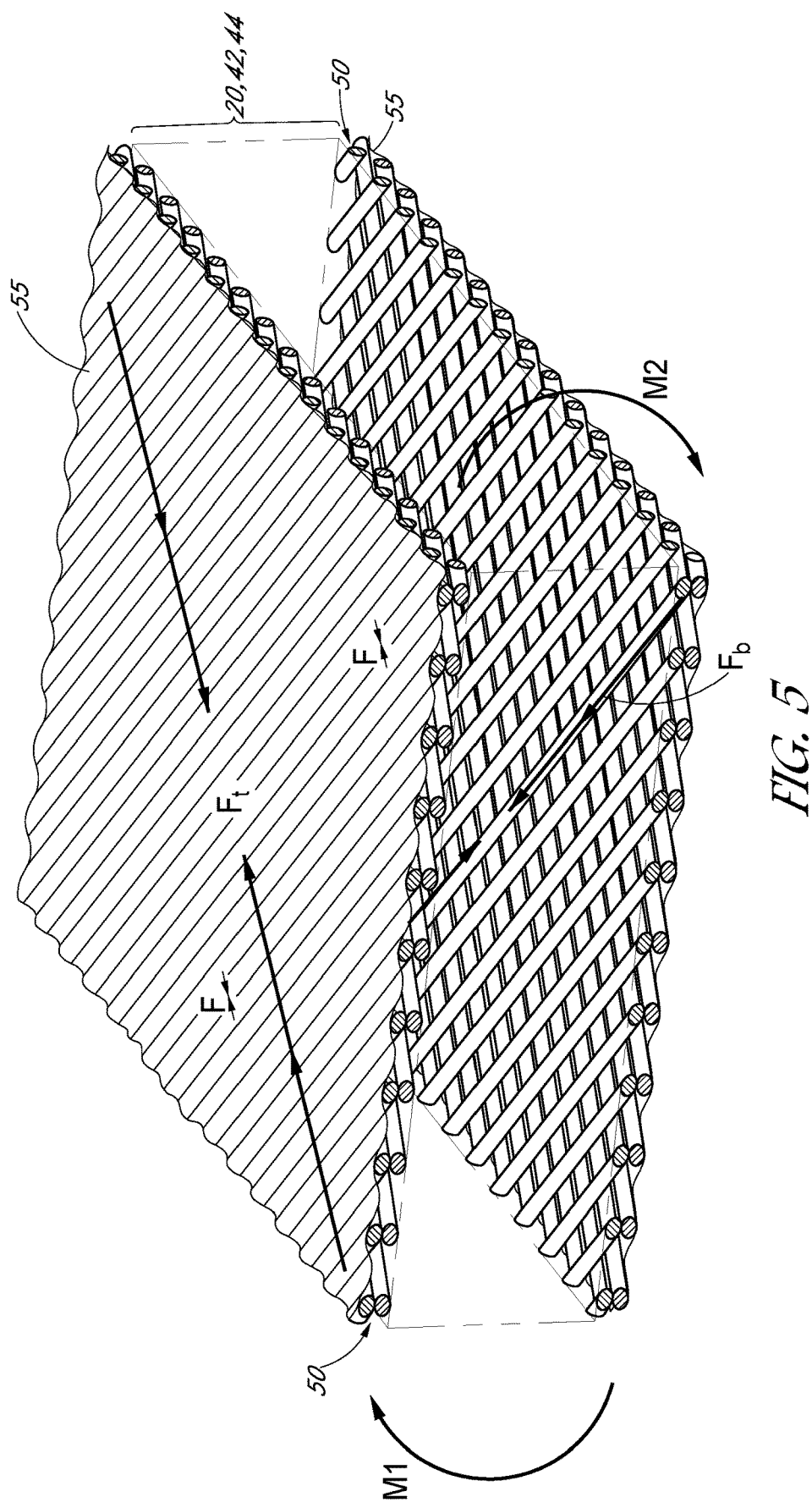
FIG. 5 is a partial sectional view showing a portion of the setup of FIG. 2 schematically, and depicting the flow media of FIG. 4 and a vacuum bag membrane during application of vacuum.

With additional reference FIG. 5, which is a partial cutaway portion of the resin infusion setup 40 showing the core 20, reinforcement 42, and peel-ply 44 schematically and depicting the flow media 50 and bag film 55 under vacuum, upon application of vacuum the bag film 55 is drawn downwardly into each top, or outer, channel 86 of the flow media 50. Vacuum bag film 55 typically stretches; however, due to the mesh structure, open spaces are defined within the flow media 50, between the vacuum film 55 and the release layer 44. The open space resulting from this "bag bridging" defines resin paths, facilitating resin flow through the flow media 50 so it can be readily distributed adjacent the fibrous reinforcement 42, being then drawn into and wetting the fibers.

The bi-planar extruded flow media 50 depicted in FIGS. 4 and 5 is very popular in resin infusion processes because its unique structure provides for fast resin flow and even resin distribution. This can be particularly advantageous in embodiments in which resin is being infused around the top, bottom and sides of a relatively long core. This flow media 50 is also particularly advantageous with polyester resins, which have a relatively fast cure time. Such polyester resins are generally preferred for surfboards due to, among other reasons, their low cost. Thus, a high-flow flow media such as the bi-planar extruded flow media is initially indicated for making surfboards. With additional reference to FIG. 2, due to its high-flow capabilities, when the bi-planar flow media is used, the preferred configuration of spiral tubing 66 extends only between the tail corners 30, and resin R flows substantially uniformly from the tail 24 to the vacuum port 68 adjacent the nose 22.

Applicants have discovered that, during application of vacuum to the bi-planar extruded flow media 50, the vacuum bag film 55 tightly engages the top strands 80, and as the film is pulled downwardly into each channel 86 between the top strands 80 during bag bridging, a force F is created urging the opposing top strands 80 toward one another. Since the top strands 80 are bonded to the bottom strands 82 at the bonded intersections 84, the top strands 80 do not slide over the bottom strands 82. Also, since the channels 86 are substantially uninterrupted along their lengths, the film 55 is drawn into each channel 86 in a consistent and uninterrupted manner. Thus, the force F is also continuous along such length. As such, the force F urging adjacent top strands 80 toward one another is not resolved, interrupted or counteracted by other forces. The force F across a single channel 86 so affected may not be particularly high. However, when combined with similar forces F from many affected top channels 86, the aggregate force Ft applied can be substantial, and is applied in a −45° direction perpendicular to the channels 86. Also, due to the repeated pattern of the bag film 55 being drawn deeply into each parallel channel, and the limited stretchability of the film 55, the entire film on the top of the stack is disproportionally stretched in the −45° direction perpendicular to the channels 86. Forces incident to such stretching are part of the aggregate force Ft.

Due to its structure, the bi-planar extruded flow media 50 on the bottom side of the core 20 is arranged so that the outer (here bottom) strands 82 and outer channels 88 extend in a −45° angle relative to the longitudinal axis of the flow media (and core). During application of vacuum, similar phenomenon results in an aggregated force Fb applied in a +45° direction.

With continued reference to FIG. 5, the forces applied during bag bridging using the bi-planar flow media 50 are depicted. As shown, the −45° force Ft on the top induces a first twisting moment force M1, and the +45° force Fb on the bottom induces a second twisting moment force M2 which, together, induce a twist deformation to the entire setup 40.

Since there is no rigid mold, the core 20 alone is left to resist the twist deformation. However, a typical surfboard core 20, made of foam such as PU, EPS or the like, typically has a shear modulus less than about 2,300 psi, and more typically less than about 2,000 psi, which may deform if such twisting forces are substantial. Such deformation can be particularly problematic for surfboards, which are often more than 6 feet long. Thus, even a modest twist can become significant over the length of the surfboard, and as such twist of even ¼-½ inch over the length of the surfboard can substantially affect surfboard performance.

In another embodiment, during setup, a bi-planar extruded flow media 50 can be longitudinally aligned for one of the top or bottom layers, and aligned in a perpendicular position for the opposite layer. In such a configuration, the aggregated forces Ft, Fb on the top and bottom would both be directed in the same, −45° direction, potentially cancelling each other out. However, there may be variations in setup between the top and bottom sides. For example, the vacuum bag film 55 on one side may have more pleats than on the other side. Such pleats may increase flexibility of the bag, and thus forces F across at least some of the channels on a particular side may be reduced or eliminated. As such, aggregate forces on one side may be different than on the other side. Also, flow media is commercially available in elongated sheets or rolls of limited width, such as about 41 in. widths, which is less than the length of a typical surfboard. Thus, one of the top or bottom sides would have a contiguous sheet of flow media, while the other side would employ multiple sheets. This would increase complexity and cost of setup. Also, the transition between the separate flow media sheets on one side introduces an area of unknown and unpredictable flow characteristics to the stack of materials, increasing the risk that resin R will be distributed at a different rate along the top of the core than along the bottom of the core. This increases the risk that resin R will not flow to some of the fibrous reinforcement on the slower-moving side. Also, the transition between the flow media sheets would disrupt the continuity of vacuum bag film engagement of the outer channels of the flow media, and thus unpredictably affect the aggregate force applied, perpetuating the likelihood of an aggregate force differential between the top and bottom. Such a force differential may lead to undesirable deformation of the core.

Figure 6:
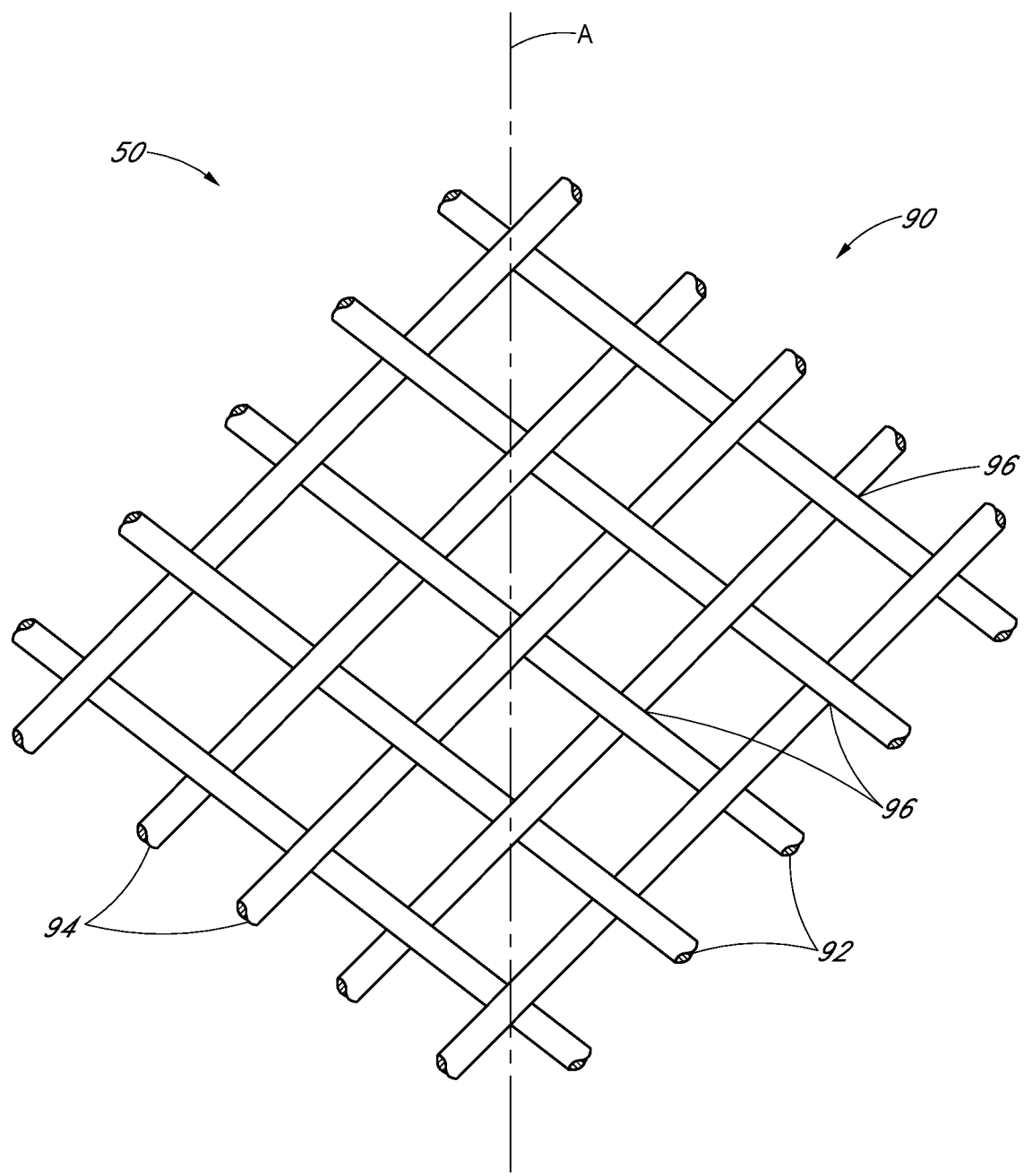
FIG. 6 is a schematic partial perspective view of another embodiment of a flow media.

With reference to FIG. 6, in another embodiment a sheet of flow media 50 comprises a woven mesh 90. In the illustrated embodiment, a group of first strands 92 are spaced apart, parallel to one another and disposed at a 45° angle relative to the axis A. A group of second strands 94 are also spaced apart and parallel to one another, but are disposed at about 90° relative to the first strands 92 (i.e., at a −45° angle relative to the axis A). In the illustrated flow media 50 embodiment, the first and second strands 92, 94 are interwoven. Further, in a preferred embodiment, the first and second strands are bonded to one another at bonded intersections 96 where the strands 92, 94 overlap one another, and thus the strands do not move or adjust over one another.

As a vacuum is drawn over the woven mesh flow media 90, the vacuum bag film 55 is pulled downwardly between adjacent strands 92, 94. However, since the strands are interwoven, no contiguous channels are defined across either the top or the bottom of the flow media sheet 90. Also, adjacent first strands 92 are never simultaneously on the outer side of the flow media. Thus, vacuum bag-induced forces are minimized. Further, due to the interwoven configuration of the strands 92, 94, forces from bag bridging are more likely to be directed in several different directions, depending on the localized weave structure, and thus local bag bridging forces are substantially cancelled out by adjacent local bag bridging forces, resulting in no or minimal aggregate forces on the top or bottom of the stack of materials.

Figure 7:
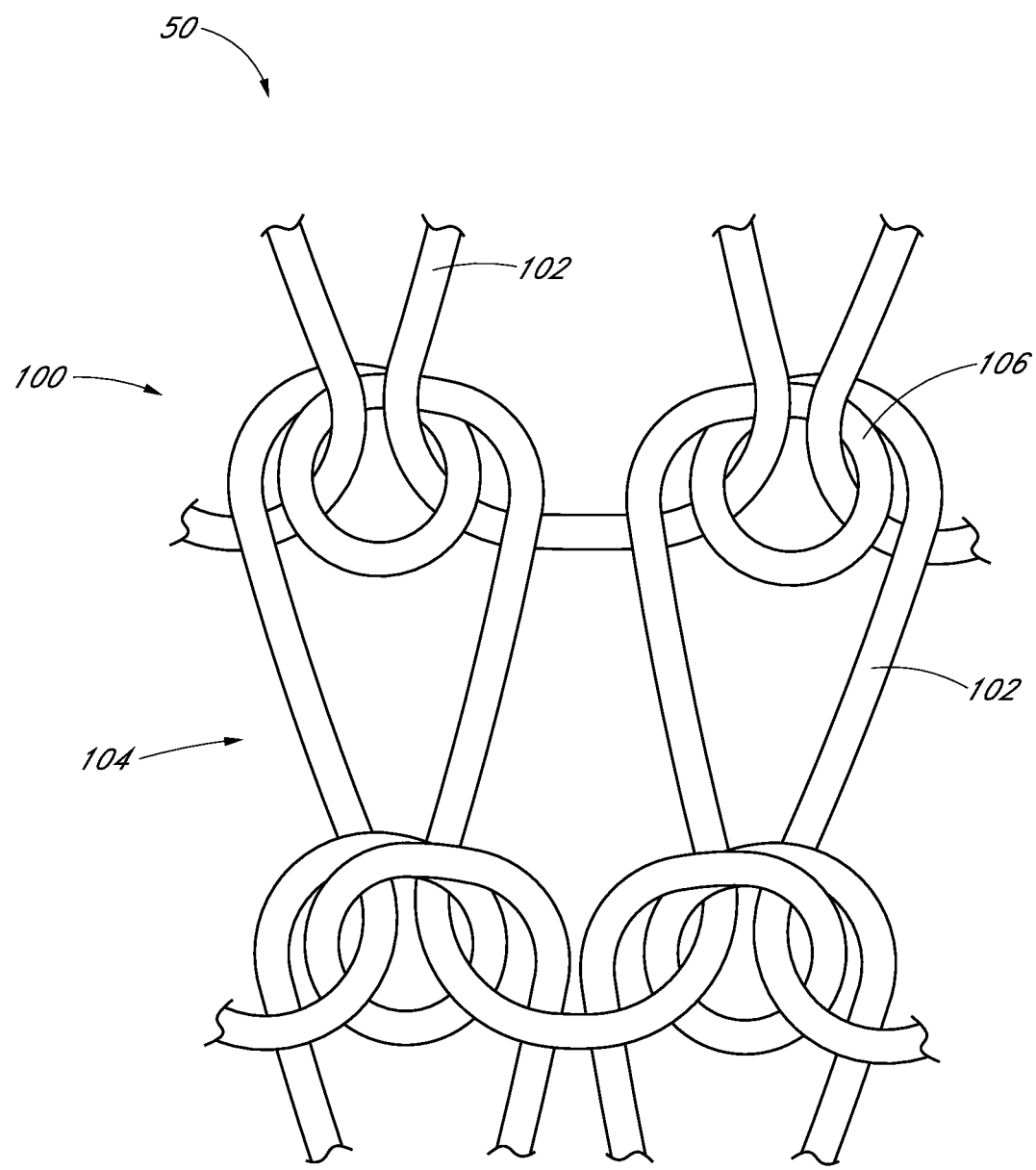
FIG. 7 is a schematic partial view of a further embodiment of a flow media.
Figure 8:
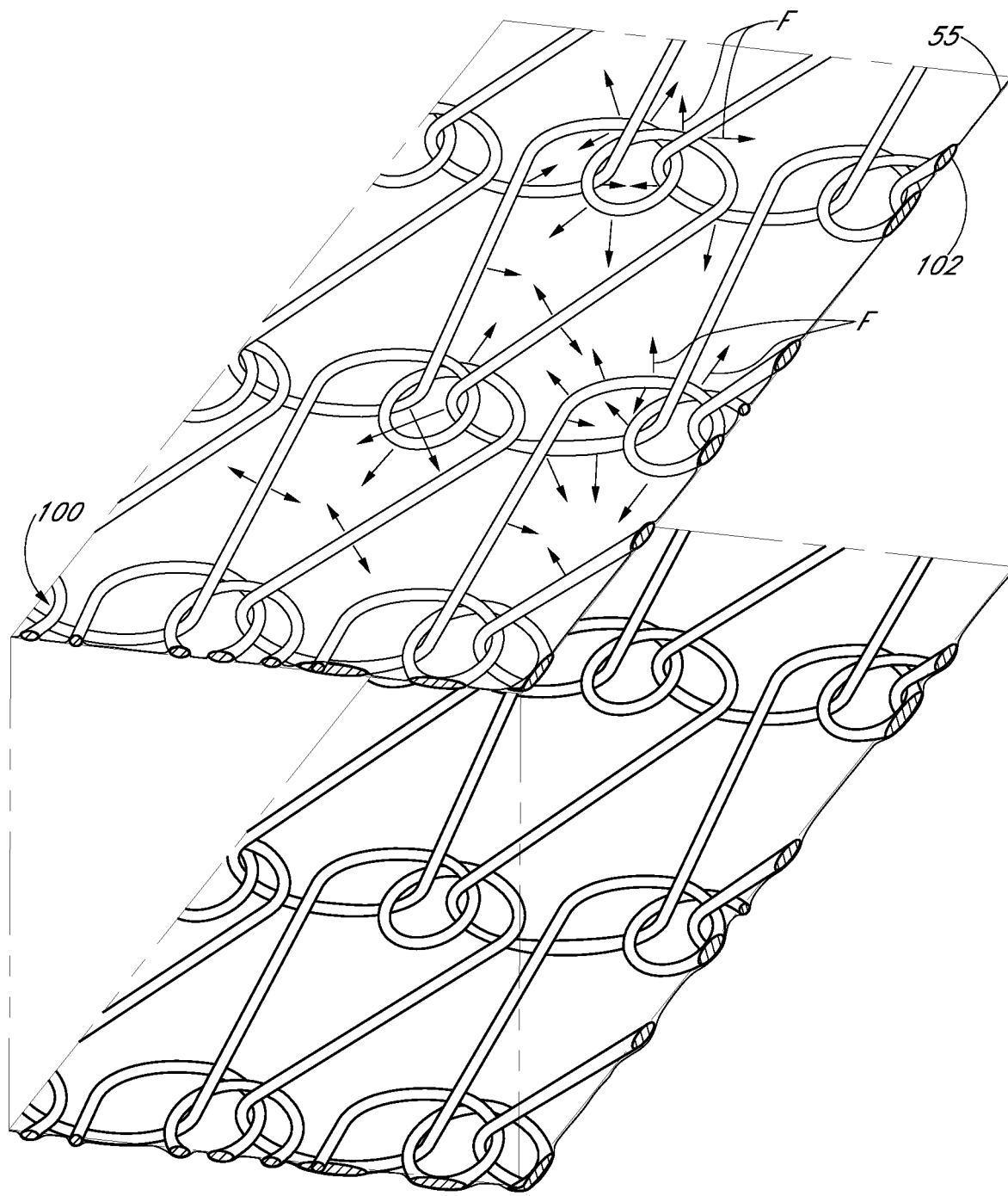
FIG. 8 is a partial sectional view showing a portion of a setup schematically, and depicting the flow media of FIG. 7 and a vacuum bag membrane during application of vacuum.

With reference next to FIGS. 7 and 8, in another embodiment, the flow media 50 comprises a sheet 100 of knitted polymer strands 102. In the illustrated embodiment, the knitted strands 102 comprise several stitches 104 employing loops 106 interleaved with one another. However, the strands 102 are not bonded to one another. In the illustrated embodiment, at least some of the loops 106 are double-looped, indicating that multiple overlapping loops are provided in certain areas of the knitting pattern. This helps the knit textile sheet 100 maintain its overall shape despite the strands 102 not being bonded to one another. Due to the nature of knit textiles, the knitted flow media 100 is flexible in all directions within the plane of the textile (while maintaining its general shape), and portions of each strand 102 are disposed on both outer and inner sides of the sheet 100. It is to be understood that the particular pattern depicted in FIG. 7 is simply one example, and several variations of knitting stitch and loop patterns can be employed, including patterns employing two, three, or several different strands 102, with or without loops, double-loops, triple- (or more) loops, or the like.

When a vacuum is drawn about a resin infusion stack employing the knitted flow media 100 (see FIG. 8), vacuum bag film 55 is, of course, drawn downward into gaps between strands 102. Forces F are anticipated to be exerted between strands due to bag bridging and the like. However, the strands 102 are not bonded to one another, and thus can slip, slide and adjust slightly relative one another, dispersing such forces. The knitted flow media itself can also stretch and adjust somewhat, which can be expected to disperse forces. Also, due to the knitted structure, no single strand of the knitted flow media extends uninterrupted along the top, or outer, side for any substantial length. Rather, strands overlap in many different configurations and directions. Thus, localized forces F resulting from bag bridging are directed in several different directions and at several different intensities. But although many localized directional forces F may be generated by bag bridging at any given strand overlap, such localized forces F can be expected to be offset, or cancelled out, by many other such localized directional forces F at the many other overlapping strands. As such, aggregation of directional forces applied to the stack due to bag bridging during vacuum draw is minimized or eliminated, as forces that may be generated are not aggregated substantially in any particular direction. And to the extent an aggregate directional force exists in the top or bottom, a substantially identical force can be expected on the other of the top or bottom so that any net aggregate directional force due to bag bridging is insignificant.

In some embodiments, knitted flow media have repeating patterns in which adjacent rows (which would extend transverse to the core axis and transverse to the length of the sheet or roll of flow media) are interconnected by a strand interweaving pattern that extends parallel to the core axis (and along the length of the sheet or roll of flow media). To the extent that such longitudinal patterns could create any aggregate force, such forces would be directed either longitudinally or normal to the axis, and would be substantially the same on the top and bottom of the core. As such, such forces would largely cancel each other out.

Knitted flow media 100 typically employ a relatively high density of strands. As such, knitted flow media 100 typically has higher resistance to resin flow and less even distribution of resin R during such flow. Due to these features, one would initially not want to use knitted flow media for infusion of surfboards, which typically require resin delivery over a relatively long length of several feet simultaneously on both the bottom and top sides and along outwardly-curving rails. Such requirements would make using a lower-flow knitted flow media more complex and less desirable than high flow media, especially when using fast-curing resins such as polyester resins or when using epoxy resins formulated for surfboards, which have a higher viscosity and cannot be thinned without negatively impacting their cured mechanical properties (unlike polyester resins). This can be particularly relevant when working with cores that expand in width and then diminish in width moving along the length of the core, as there is increased risk of uneven resin flow leaving "islands" of unwetted reinforcement. Notably, Applicant's efforts to use a setup similar to that illustrated in FIG. 2 using a knitted flow media instead of a bi-planar extruded flow media were unsuccessful, resulting in inconsistent and inadequate wetting of reinforcement.

Figure 9:
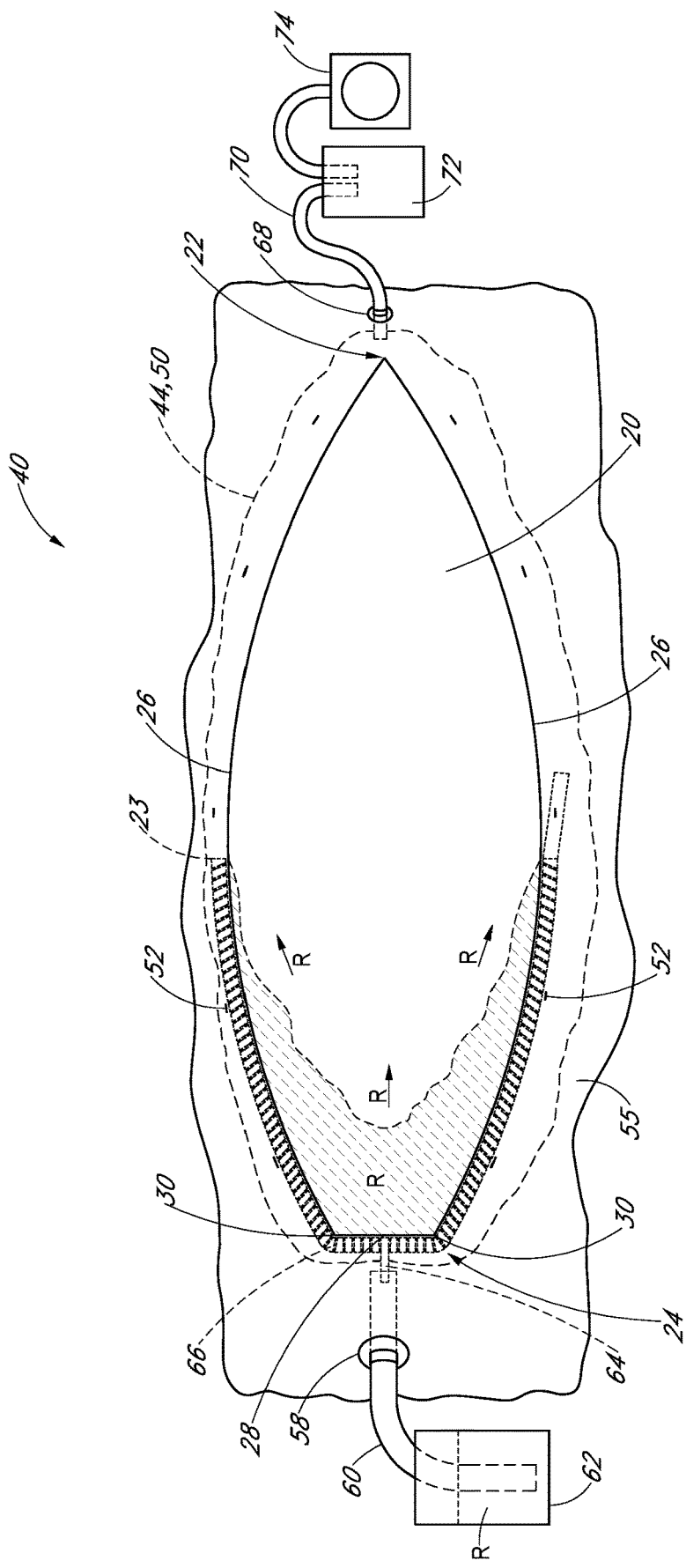
FIG. 9 is a schematic top view of another embodiment depicting an assembled vacuum-assisted resin infusion setup for encasing the surfboard core of FIG. 1 in a composite skin.

With reference next to FIG. 9, in an embodiment using a knitted flow media 100 (as in FIG. 7), the resin infusion set up 40 is adjusted so that the spiral tubing 66 extends along the tail edge 28 and around the opposing tail corners 30, and further along the rails 26 toward the nose 22 until about the widest point 23 of the core 20. This configuration initiates resin flow along the rails 26 of the core 20 much closer than the vacuum port 68 (giving resin R a head start along the rails) in order to make up for the decreased distribution ability of the knitted flow media 100 and the comparatively longer flow path along the curving rails 26 from tail 24 to nose 22. Preferably, however, the vacuum port 68 remains adjacent and spaced from, rather than atop or otherwise in contact with, the core 20 and the fiber-reinforced fabric 42. Also, preferably only a single resin port 58 and single vacuum port 68 are employed. Also, as discussed above, although the spiral tube 66 may approximate and follow the shape of the tail edge 28 and rails 26, preferably it is spaced from the core sufficiently to enable the top and bottom consumable flow media layers to come together between the core and spiral tube in order to avoid the tube leaving an imprint on the composite as it is cured.

In a preferred embodiment, the spiral tube 66 (or other resin dispersing tube) extends along the tail edge 28 and along the rails 26 (preferably following the rail curvature) and terminates at the widest point 23 or, in some embodiments, at a point spaced from the widest point 23 a distance less than 15% of the length of the surfboard. In a more preferred embodiment, the tube 66 terminates at a point spaced from the widest point 23 a distance less than 10% of the length of the surfboard. In a still more preferable embodiment the tube 66 terminates at a point spaced from the widest point 23 a distance less than 5% of the length of the surfboard. In some embodiments the tube 66 terminates substantially at the widest point 23. These embodiments are particularly preferred in cores 20 in which the widest point 23 is closer to the tail 24 than to the nose 22. This configuration compensates for the reduced flow ability of such knitted flow media in light of the curving core, while also protecting against creating islands of unwetted reinforcement material. In additional embodiments, such as shown in ghost lines in FIG. 9, the spiral tube 66 can extend past the widest point 23, but diverges from following the curvature of the core. In some embodiments, the spiral tube 66 continues to diverge from following the curvature of the core far past the widest point 23, extending even to a point aligned with (though spaced transversely from) the nose 22.

Figure 10:
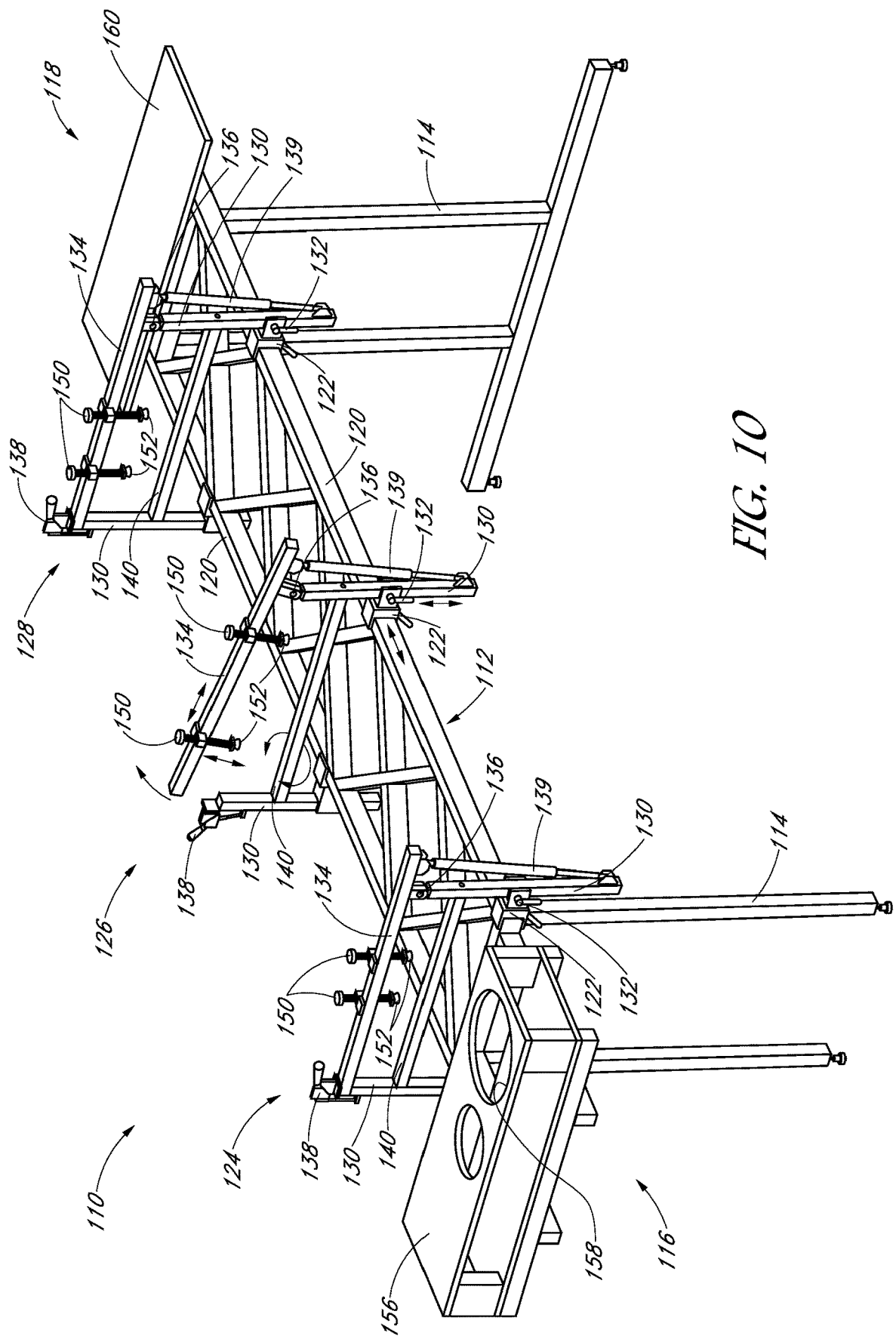
FIG. 10 is a perspective view of an embodiment of a brace.

With reference next to FIG. 10, in accordance with another embodiment, an adjustable brace 110 can be employed to secure the infusion set up in the desired position, counteracting twisting forces that may be generated during parts of the resin infusion process. When the assembled stack of materials of a resin infusion setup is held in the brace 110 during application of vacuum, forces tending to deform the core 20 can be counterbalanced by the brace 110 so that the core 20 retains its desired shape without substantially bending/twisting.

In the illustrated embodiment, the adjustable brace 110 comprises an elongated frame 112 supported by a plurality of legs 114. The elongated frame 112 extends longitudinally from a resin side 116 to a vacuum side 118. The frame 112 comprises opposing rails 120 on which first, second and third pairs of slidable mounts 122 are attached in a manner so as to be slidable along the rails 120 but lockable at a desired position, such as by a clamping handle 128. In the illustrated embodiment, first, second, and third supports 124, 126, 128 are fit upon respective ones of the first, second and third pairs of sliding mounts 122. Each support comprises a pair of vertical members 130 that preferably are also slidably connected to the sliding mount 122 and can be secured in place via a handle-operated clamp 132, detent, or the like. A top cross member 134 extends across the opposing vertical members 130. In the illustrated embodiment, the top cross member 134 is hingedly attached to one of the vertical members 130, so as to be rotatable about a hinge 134, and can be releasably clamped onto the other of the vertical members, such as via another handle-operated clamp 138. A strut 139 can be attached to the top cross member 134 and vertical member 130 to hold the top member 134 in an "open" position when the clamp 138 is released. A bottom cross member 140 also extends between the vertical members 130 and is spaced from the top cross member 134. In a preferred embodiment, the bottom cross member 140 comprises a bar having a substantially flat surface and which is configured to rotate about its axis so as to adjust to the surface angle of whatever structure it may support.

In the illustrated embodiment, a pair of spaced apart clamps 150 are supported upon each top cross member 134. Preferably, the clamps 150 are slidable along the top cross member and include pads 152 that depend below the top cross member 134. The clamps 150 are also vertically adjustable so that the pads 152 can be moved up and down. Most preferably, the pads 152 are mounted on a gimbal-type structure so as to readily rotate to adjust to the angle of the surface of whatever structure the pad 152 may engage.

In additional embodiments, the bottom cross member 140 may also include clamps having pads that extend upwardly so that a structure can be held between the top and bottom clamp pads.

In some embodiments the clamps can be vertically adjustable by a screw-type adjustment configuration. However, it is to be understood that various types and methods of vertical adjustment and engagement can be employed. For example, in other embodiments, the clamps may be spring-loaded to exert a spring force to the pads. As such, the clamps essentially self-adjust their engagement with the infusion setup. The magnitude of such a spring force can be selected to resist twisting of the infusion setup while also minimizing the likelihood that an imprint of the pad will be made in the cured composite. Various types of spring configurations can be employed, such as configurations exerting substantially constant force over an operational length. In still further embodiments, hybrid configurations can be employed, such as employing screw-type adjustment on a macro scale combined with a spring-loaded configuration to facilitate self-adjustment and keep applied forces within a desired range.

In the illustrated embodiment, a resin side table 156 is provided at or adjacent the resin side 116 of the frame 112 and provides both a working surface and a holding structure, such as a cut out 158, configured to securely hold a resin container. In some embodiments, a vacuum side table 160 may be provided at the vacuum side 118 to provide a working surface and to support items, tools and machinery such as the resin brake, vacuum or the like.

In accordance with one embodiment, an assembled stack of materials ready for resin infusion can be held by the adjustable brace 110 during the vacuum draw and all or part of resin infusion in order to prevent the part from deforming during the vacuum-assisted resin infusion process. In a preferred embodiment, to load the assembled setup each of the top cross members 134 is unlocked and rotated about its hinge 136 to an open position, and a fully or mostly-assembled stack of materials can be placed so as to be supported on the bottom cross members 140, which each rotate to engage the surface of the setup. Preferably the height of the supports 124, 126, 128 is adjusted to best match the curvature of the part, such as the bottom rocker if the part is a surfboard.

Once the material stack is appropriately resting on the bottom cross members 140, the top cross members 134 can be closed and clamped into position. Each of the top clamps 150 can then be adjusted so that the pads 152 engage the top surface of the stack. In the illustrated embodiment, each pair of top clamps 150 is disposed about equidistant from a longitudinal centerline of the core. Preferably, the top clamps 150 are positioned so that the pads 152 engage the stack of materials near an edge of the core, or near the rail if a surfboard core. Thus, the top clamps will be farther away from one another at locations where the core is wide than they are at locations where the core is narrow.

Preferably, the top and bottom cross members 134, 140, and associated clamps 150, are placed to engage the stack of materials when the core is in a preferred, non-deformed condition, and a user preferably will confirm such while placing the stack of materials in the brace 110. Together, the top and bottom cross members 134, 140, including the clamps 150, operate to restrain deformation, and specifically twisting deformation, of the core during the resin infusion process. Most preferably, however, the brace will avoid applying excessive forces to the stack that will result in marks or indentations in the core or laminate.

In the illustrated embodiment, the first support 124 is disposed adjacent the tail end 24 of the surfboard core 20, the third support 128 is disposed adjacent the nose 22 of the core 20, and the second support 126 is disposed in between. In a preferred embodiment, the second support 126 is disposed at or near the widest part of the surfboard core 20. While it is anticipated that a brace 110 will employ at least two supports, it is to be understood that other brace embodiments may include more than three supports.

In a preferred embodiment, once the material stack is appropriately clamped within the adjustable brace 110, the vacuum is drawn. During the vacuum draw, the brace 110 will resist deflection forces, such as those that may be attributable to vacuum bag bridging or other forces incident to interactions of layers among the stack materials. As such, high-flow flow media such as biplanar extruded flow media can be used in combination with a brace without the resultant part substantially deforming. Resin can then be introduced in a normal manner, and will flow as desired. The material stack may remain in the adjustable brace during resin infusion, and resin will still flow to fibrous reinforcement layers at or adjacent the points of contact of the pads 152.

In a preferred embodiment, the material stack remains within the adjustable brace for the entirety of the resin infusion process, including during initial curing of the resin, and at least until the vacuum is removed.

In some embodiments, once the vacuum is fully drawn, the material stack can be expected to retain its shape. Thus, although keeping the material stack secured within the adjustable brace 110 during the vacuum draw stage ensures maintenance of the desired shape without deformation, once vacuum draw is complete the part is less likely to deform substantially. As such, in some embodiments, after the vacuum draw is complete and the material stack 40 has reached a stable position, one or more of the support top members 124, 126, 128 of the brace 110 can be released, such as by opening the top members or moving the pads upwardly away from the top of the material stack. Infusion of resin can then proceed.

In some embodiments, adjustments to the positions of the supports can be made after the material stack and vacuum bag are placed in the brace. In additional embodiments, the foam core can be placed in the brace 110 prior to assembling the material stack. Positions of the clamps, pads and the like can be adjusted for optimal fit, including, in some embodiments, accommodation for a thickness of the reinforcement layer and consumables such as the peel-ply, flow media and bag film. The core can then be removed from the brace 110 and bagging of the core can proceed. Once the vacuum bag setup 40 is complete, the setup is again placed in the brace, which has been pre-adjusted to the desired clamp positions. Fine tuning adjustments may be made, if necessary, and the resin infusion process may proceed.

In yet another embodiment, top and/or bottom clamps can be motorized, and even may include sensors to detect resistance forces and/or position. Such motors and sensors can be connected to a computer controlled module, which may have an electronic file detailing the shape of the core stored in a memory thereof. As such, the material stack can be placed in the brace and the computer controlled module will adjust the positions of the clamps and pads so that a desired positioning is obtained, while optimizing applied forces to both prevent substantial deformation and to avoid interference with resin infusion in the areas engaged by the pads. In another embodiment, the computer monitors forces sensed during the resin infusion process, detects potential deformation, and operates the clamps to counteract such deformation.

Figure 11:
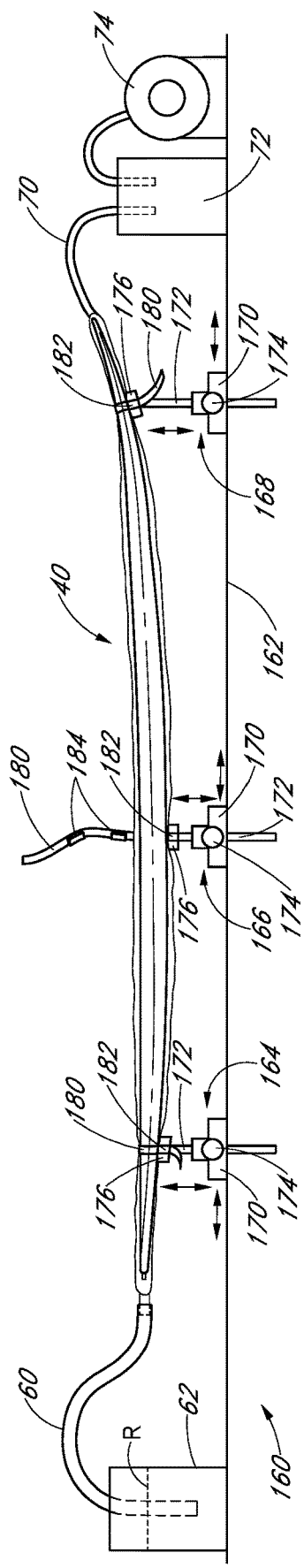
FIG. 11 is a side view of another embodiment of a brace having a resin infusion setup for a surfboard placed thereon.

With reference next to FIG. 11, another embodiment of an adjustable brace 160 comprises a frame 162 that supports first 164, second 166 and third 168 support assemblies. Each support assembly 164, 166, 168 comprises an opposing pair of bases 170 that are slidable over the frame 162, so as to be positioned at a desired position along the resin infusion setup 40. A vertical member 172 is supported by each base 170 so as to be slidable relative to the base 170, but lockable in a desired position, such as by a threaded knob 174 that can engage the vertical member 172 sufficiently to prevent further vertical movement relative to the base 170. Such a configuration will enable infinite adjustment. Another embodiment may desirably employ discrete detents for positioning the vertical member relative to the base.

In the illustrated embodiment, a cross member 176 extends between and is supported by opposing pairs of vertical members 172. The cross member 176 may include flat or curving surfaces for supporting an infusion setup 40 thereon, and may be rotatable relative to the vertical members 172. In some embodiments the cross members may include, for example, spaced apart foam blocks, vertically-adjustable clamps, gimbal-mounted contact pads, or the like.

Each support assembly in the illustrated adjustable brace 160 includes a strap 180 configured to be drawn over the top of an infusion setup 40 (such as the illustrated vacuum-bagged surfboard core). The strap 180 may be permanently connected to a first end of the cross member, and secured with a clamp 182 on a second end of the cross member 176. In some embodiments, the strap 180 directly engages the infusion setup 40 across the entire top of the setup. In other embodiments, such as depicted on the illustrated second support 166, which is depicted as not yet clamped into a closed position, two or more spaced apart blocks 184, such as semi-rigid or rigid foam blocks, can be attached to the strap 180, and only the foam blocks 184 directly engage, and apply force to, the infusion setup. A space is maintained between the blocks 184 to minimize any restriction of resin flow caused by the blocks contacting and applying pressure to the material stack 40. Preferably, the locations of the blocks can be adjusted so that the blocks can be placed at or adjacent the edges of the core.

The embodiments discussed above have disclosed structures and methods with substantial specificity. This has provided a good context for disclosing and discussing inventive subject matter. However, it is to be understood that other embodiments may employ different specific structural shapes and interactions.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above, but should be determined only by a fair reading of the claims that follow.

What is claimed is:

1. A method of making a water sports board, comprising: assembling a dry layup about an elongated foam core, comprising: wrapping a fibrous reinforcement about the elongated foam core, when the elongated foam core is in an at rest configuration having a desired, non-deformed shape; enclosing the elongated foam core and the fibrous reinforcement within a release layer; enclosing the elongated foam core, the fibrous reinforcement and the release layer within a flow media, the flow media comprising a plurality of overlapping polymer strands that are slidable over one another; enclosing the elongated foam core, the fibrous reinforcement, the release layer and the flow media within a vacuum bag; and establishing a resin inlet and a vacuum port, the resin inlet being proximal of a proximal end of the elongated foam core, the vacuum port being distal of a distal end of the elongated foam core; resting the assembled dry layup on a plurality of supports, the assembled dry layup being unsupported between the plurality of supports so that the elongated foam core remains in the at rest configuration while resting on the plurality of supports; establishing a vacuum via the vacuum port, the vacuum compressing the assembled dry layup so that the vacuum bag is drawn into contact with the flow media and at least some of the plurality of overlapping polymer strands of the flow media slide over others of the plurality of overlapping polymer strands to disperse forces generated between the vacuum bag and the flow media; connecting the resin inlet to a source of resin so that resin is infused through the fibrous reinforcement from the proximal end to the distal end; and removing the release layer and the flow media after resin is infused throughout the fibrous reinforcement.

2. The method of claim 1, wherein the plurality of overlapping polymer strands are knitted together.

3. The method of claim 2, wherein the plurality of overlapping polymer strands are knitted via a repeating knitting pattern in which a first strand overlaps a second strand with a double loop.

4. The method of claim 2, wherein the elongated foam core has a modulus less than 2,000 psi.

5. The method of claim 2, wherein the elongated foam core comprises opposing edges that extend from the proximal end to the distal end, and a widest point between the opposing edges is disposed between the proximal end and the distal end, and additionally comprising arranging a resin dispersing tube adjacent the proximal end and extending distally along and adjacent the opposing edges to a termination point spaced from the distal end, and placing the resin dispersing tube into communication with the resin inlet, the resin inlet being proximal of the resin dispersing tube.

6. The method of claim 5, wherein the termination point is distal of the widest point, and wherein the resin dispersing tube diverges from the opposing edges moving distally from of the widest point.

7. The method of claim 5, wherein the termination point is spaced a distance less than 10% of the length of the elongated foam core from the widest point.

8. The method of claim 7, wherein the termination point is closer to the proximal end than the distal end.

9. The method of claim 1, wherein the plurality of supports are part of an adjustable brace, and additionally comprising, prior to establishing a vacuum, adjusting a plurality of spaced-apart clamps of the brace to engage the assembled dry layup so as to inhibit bending of the elongated core.

10. The method of claim 9 additionally comprising removing the vacuum after resin is infused and cured, and comprising maintaining the plurality of clamps in engagement with the assembled dry layup until after the vacuum is removed.

11. A method of enclosing an elongated core within a composite skin without employing an external mold, comprising: assembling a layup stack about an elongated core, comprising: wrapping a fibrous reinforcement about the elongated core so as to enclose the elongated core; enclosing the elongated core and the fibrous reinforcement within a release layer; enclosing the elongated core, the fibrous reinforcement and the release layer within a flow media, the flow media comprising a plurality of polymer strands that are interleaved so that a first one of the plurality of polymer strands is disposed outwardly relative to a second one of the plurality of polymer strands over a first portion of the flow media and the second one of the plurality of polymer strands is disposed outwardly relative to the first one of the plurality of polymer strands over a second portion of the flow media, the flow media comprising a plurality of first portions and a plurality of second portions; enclosing the elongated core, the fibrous reinforcement, the release layer and the flow media within a vacuum bag; and establishing a resin inlet and a vacuum port, the resin inlet being proximal of a proximal end of the elongated core, the vacuum port being distal of a distal end of the elongated core; resting the assembled layup stack atop a plurality of spaced apart bottom supports so that the assembled layup stack is unsupported between adjacent ones of the plurality of spaced apart bottom supports; establishing a vacuum via the vacuum port so that the assembled layup stack is compressed and the vacuum bag is drawn at least partially into the flow media; connecting the resin inlet to a source of resin so that resin is infused throughout the fibrous reinforcement from the proximal end to the distal end; and removing the release layer and the flow media after resin is infused throughout the fibrous reinforcement.

12. The method of claim 11, wherein the first portion of the flow media is adjacent the second portion of the flow media, and the flow media is configured in a pattern of repeating first portions interposed between second portions.

13. The method of claim 11, wherein the plurality of polymer strands of the flow media are woven together so that each polymer strand overlaps a plurality of the polymer strands at a plurality of spaced apart overlapping points, and the plurality of polymer strands are attached to one another at each of the overlapping points.

14. The method of claim 11, wherein the plurality of polymer strands of the flow media are knitted to one another so that the plurality of polymer strands slide over one another when the vacuum bag is drawn at least partially into the flow media during establishment of the vacuum.

15. The method of claim 14, wherein the elongated core comprises a foam water sports board core having a nose at the distal end, a tail edge at the proximal end, the tail edge having opposing tail corners, and arcuate rails extending from the tail corners to the nose.

16. The method of claim 15 additionally comprising placing the assembled layup stack in a brace comprising the plurality of spaced apart bottom supports, engaging a plurality of spaced apart contacts with the assembled layup stack so that the plurality of spaced apart contacts engage the assembled layup stack adjacent the arcuate rails, wherein the plurality of contacts are positioned and configured to block the foam water sports board core from deforming when the vacuum is established.

17. The method of claim 15, wherein the resin inlet comprises a dispersing tube, the dispersing tube being configured to distribute resin along its length between opposing ends, and wherein the dispersing tube extends along and adjacent the tail end and around the tail corners so that the opposing ends are spaced from the tail corners so that resin is introduced to the arcuate rails at a location spaced distally from the tail end.

18. The method of claim 17, wherein a single top layer of the flow media is disposed atop the foam water sports board core and a single bottom layer of the flow media is disposed below the foam water sports board core.

19. The method of claim 17, wherein the opposing ends are within about 10% of the length of the foam water sports board core from a widest point between the rails of the foam water sports board core.

20. The method of claim 19, wherein opposing portions of the dispersing tube diverge from one another from the tail corners to the opposing ends.

* * * * *